United States Patent
Wellborn, Sr. et al.

(10) Patent No.: US 9,022,436 B2
(45) Date of Patent: May 5, 2015

(54) ACTUATOR ARRANGEMENT FOR A VEHICLE DOOR LATCH

(75) Inventors: Carl W. Wellborn, Sr., Detroit, MI (US); Michael Joseph Levy, Berkley, MI (US); Alexander Thomas Riegelman, Berkley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 313 days.

(21) Appl. No.: 13/101,477

(22) Filed: May 5, 2011

(65) Prior Publication Data
US 2012/0280520 A1 Nov. 8, 2012

(51) Int. Cl.
*E05B 3/00* (2006.01)
*E05B 85/22* (2014.01)
*B60N 2/46* (2006.01)
*E05B 81/04* (2014.01)
*E05B 81/18* (2014.01)
*E05B 81/76* (2014.01)
*E05B 85/12* (2014.01)
*E05C 17/44* (2006.01)

(52) U.S. Cl.
CPC .............. *E05B 85/22* (2013.01); *B60N 2/466* (2013.01); *E05B 81/04* (2013.01); *E05B 81/18* (2013.01); *E05B 81/76* (2013.01); *E05B 85/12* (2013.01); *Y10S 292/23* (2013.01)

(58) Field of Classification Search
USPC ................... 292/DIG. 23, 338, 336.3
See application file for complete search history.

(56) References Cited

U.S. PATENT DOCUMENTS

| 1,145,471 | A | * | 7/1915 | Dobrick | ........................ 16/436 |
| 3,338,621 | A | | 8/1967 | Bertsch et al. | |
| 3,993,338 | A | * | 11/1976 | Cherbourg et al. | ........ 292/336.3 |
| 3,993,339 | A | * | 11/1976 | Cherbourg et al. | ........ 292/336.3 |

(Continued)

FOREIGN PATENT DOCUMENTS

| CN | 1295642 A | 5/2001 |
| CN | 1353054 A | 6/2002 |

(Continued)

OTHER PUBLICATIONS

State Intellectual Property Office of the People'S Republic of China, Office Action for Chinese Patent Application No. 201210135721.4, mailed Jan. 30, 2014.

(Continued)

*Primary Examiner* — Kristina Fulton
*Assistant Examiner* — Faria Ahmad
(74) *Attorney, Agent, or Firm* — Ingrassia Fisher & Lorenz, P.C.

(57) ABSTRACT

An actuator arrangement is disclosed herein for an electronically actuatable door latch that controls a door of a vehicle. The actuator arrangement includes, but is not limited to, an actuating member that is connected to the door and that is operatively coupled to the electronically actuatable door latch. The actuating member is configured to actuate the electronically actuatable door latch when the actuating member is pushed in an outboard direction. The actuator arrangement further includes a bracing member that is mounted to the door proximate the actuating member at a position that is inboard of the actuating member. The bracing member permits a user to brace against the bracing member when pushing the actuating member in an outboard direction.

20 Claims, 7 Drawing Sheets

(56) References Cited

U.S. PATENT DOCUMENTS

| | | | |
|---|---|---|---|
| 5,039,145 A * | 8/1991 | Frye | 292/336.3 |
| 6,598,912 B2 * | 7/2003 | Hillgaertner et al. | 292/225 |
| 7,204,530 B2 * | 4/2007 | Lee | 292/336.3 |
| 8,146,393 B2 * | 4/2012 | Katagiri et al. | 70/208 |
| 8,245,548 B2 * | 8/2012 | Sibley et al. | 70/208 |
| 2004/0232710 A1 * | 11/2004 | Jooss et al. | 292/336.3 |
| 2005/0057047 A1 * | 3/2005 | Kachouh et al. | 292/201 |
| 2005/0110279 A1 * | 5/2005 | Kalsi | 292/144 |
| 2005/0230982 A1 | 10/2005 | Lee | |
| 2008/0084074 A1 * | 4/2008 | Monig et al. | 292/201 |
| 2010/0127516 A1 * | 5/2010 | Fannon | 292/336.3 |
| 2010/0237634 A1 * | 9/2010 | Gandhi | 292/254 |
| 2011/0101709 A1 * | 5/2011 | Katsumata et al. | 292/201 |
| 2012/0167642 A1 * | 7/2012 | Savant et al. | 70/91 |

FOREIGN PATENT DOCUMENTS

| | | |
|---|---|---|
| DE | 10132077 A1 | 1/2003 |
| WO | 0221455 A1 | 3/2002 |

OTHER PUBLICATIONS

State Intellectual Property Office of the Peoples' Republic of China, Office Action in Chinese Patent Application No. 201210135721.4, mailed Sep. 26, 2014.

* cited by examiner

ACTUATOR ARRANGEMENT FOR A VEHICLE DOOR LATCH

TECHNICAL FIELD

The technical field generally relates to a door of a vehicle, and more particularly relates to an actuator arrangement for a vehicle door latch.

BACKGROUND

A conventional vehicle typically includes multiple doors, each of which includes a latch that is configured to engage a structure on the vehicle. When the door latch is engaged with the structure on the vehicle, the door latch secures the vehicle door in a closed state. The door latch is typically mounted internally to the door and is therefore not directly accessible to a user.

Actuator assemblies that are configured to actuate the door latch are commonly assembled to the door in a position that is accessible to user from inside of the vehicle and that allows the user to open the door from the inside. To operate a conventional actuator assembly, the user first grasps the actuator assembly, then pulls on the actuator assembly to unlatch the door latch, and then, while continuing to pull on the actuator assembly, pushes on the door to swing it open, typically with an elbow or shoulder.

While conventional actuator assemblies are adequate, there is room for improvement. The operation of a conventional actuator assembly requires the user to have a certain amount of manual dexterity in order to segregate one or two fingers from the others in order to properly grasp or engage the actuator assembly. Furthermore, the act of pulling on the actuator assembly with the user's hand while simultaneously pushing on the door with the user's elbow and/or shoulder requires the user to have a generally unencumbered range of motion for the arm closest to the door. Furthermore, conventional latches are not configured to serve as grab handles. Typically, while opening the door, the user must release the latch and quickly reach for a separate grab handle to prevent the vehicle door from swinging open in an uncontrolled manner. In the event that a user is injured, ill, or suffers from a condition that limits the user's mobility or range of motion, the user may be unable to simultaneously pull on the actuator assembly, push on the vehicle door, and then quickly relocate their hand to a grab handle to control the vehicle door as it swings open.

One solution has been to equip vehicle doors with an electronically actuatable door latch. One such solution entails mounting a relatively small button to an inboard portion of the vehicle door. The button is mounted to an inboard side of an armrest and is positioned and sized to be actuated by a user's thumb. While this solution does reduce the amount of dexterity required by a user to open the door of the vehicle, there is still room for improvement.

SUMMARY

An actuator arrangement is disclosed herein for an electronically actuatable door latch that controls a door of a vehicle.

In an embodiment, the actuator arrangement includes, but is not limited to, an actuating member that is connected to the door and that is operatively coupled to the electronically actuatable door latch. The actuating member is configured to actuate the electronically actuatable door latch when the actuating member is pushed in an outboard direction. The actuator arrangement further includes a bracing member that is mounted to the door proximate the actuating member at a position that is inboard of the actuating member. The bracing member permits a user to brace against the bracing member when pushing the actuating member in an outboard direction.

In another embodiment, the actuator arrangement includes, but is not limited to, an actuating member that is connected to the door and that is configured to move in an outboard direction relative to the door. The actuator arrangement further includes a switch that is positioned to engage the actuating member when the actuating member moves in the outboard direction. The switch is operatively coupled to the electronically actuatable door latch and is configured to actuate the electronically actuatable door latch when the actuating member moves in the outboard direction. The actuator arrangement further includes a bracing member that is mounted to the door proximate the actuating member at a position that is inboard of the actuating member. The bracing member permits a user to brace against the bracing member when pushing the actuating member in an outboard direction.

In another embodiment, the actuator arrangement includes, but is not limited to, an actuating member that is connected to the door and that is configured to move in an outboard direction relative to the door. The actuator arrangement further includes a switch that is positioned to engage the actuating member when the actuating member moves in the outboard direction and that is configured to transmit an actuation signal when the actuating member engages the switch. The actuator arrangement further includes a controller that is communicatively coupled with the switch and that is operatively coupled with the electronically actuatable door latch. The controller is configured to actuate the electronically actuatable door latch when the controller receives the actuation signal from the switch. The actuator arrangement further includes a bracing member that is mounted to the door proximate the actuating member at a position inboard of the actuating member. The bracing member permits a user to brace against the bracing member when pushing the actuating member in an outboard direction.

DESCRIPTION OF THE DRAWINGS

One or more embodiments will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

An improved actuator arrangement for actuating and electronically actuatable door latch for a door of a vehicle is disclosed herein. The actuator arrangement includes an actuating member mounted to the door of the vehicle and operatively coupled to the electronically actuatable door latch. Such actuating members are known in the art and are disclosed and described in pending U.S. patent application Ser. No. 12/613,657, which was filed on Nov. 6, 2009 with the United States Patent and Trademark Office and which is hereby incorporated herein by reference in its entirety. The actuator arrangement further includes a bracing member mounted to the door of the vehicle at a location proximate to the actuating member and inboard thereof. The bracing member provides a structure for a user to brace against when pushing on the actuating member. This arrangement permits a user to move their hand around the bracing member in a twisting motion to actuate the actuating member and further provides the user with a structure to grasp to control the door of the vehicle as the door swings open.

A further understanding of the above described actuator arrangement for actuating an electronically actuatable door latch of a door of a vehicle may be obtained through a review of the illustrations accompanying this application together with a review of the detailed description that follows.

Figure 1:
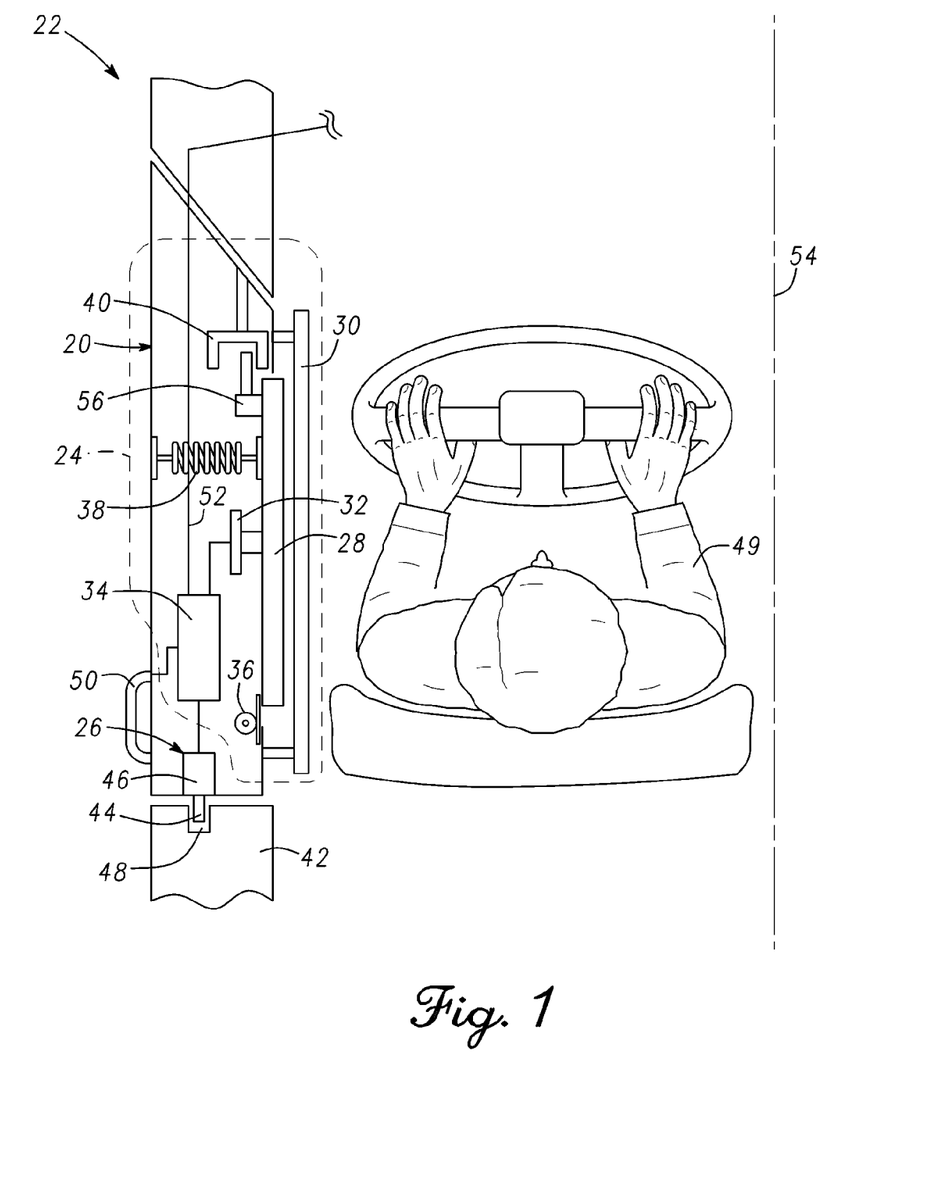
FIG. 1 is a schematic, overhead view illustrating a door of a vehicle equipped with an embodiment of an actuator arrangement of the present disclosure prior to actuation of a door latch.

FIG. 1 is a schematic, overhead view illustrating a door 20 of a vehicle 22 equipped with an embodiment 24 of an actuator arrangement of the present disclosure prior to actuation of an electronically actuatable door latch 26. In the illustration, embodiment 24 of the actuator arrangement is illustrated as being implemented on the driver side of vehicle 22. It should be understood that embodiment 24 may be implemented on any door of vehicle 22. It should also be understood that embodiment 24 of the actuator arrangement may be implemented on any type of vehicle, including, but not limited to, automobiles, trains, watercraft, aircraft, and spacecraft.

Embodiment 24 includes an actuating member 28 and a bracing member 30. Embodiment 24 further includes a switch 32, a controller 34, a hinge 36, a spring 38, and a cage member 40. In other embodiments, different components as well as a greater or lesser number of components may be included in embodiment 24 without departing from the teachings of the present disclosure.

Electronically actuatable door latch 26 is mounted to door 20 and is configured for engagement with b-pillar 42 of vehicle 22. Electronically actuatable door latch 26 has a latch portion 44 that is configured to retract inwardly and to extend outwardly with respect to a main body portion 46. When latch portion 44 is extended (as illustrated in FIG. 1), latch portion 44 fits within, and engages with, a recess 48 of b-pillar 42 to inhibit door 20 from swinging open. When latch portion 44 is retracted within main body portion 46, latch portion 44 disengages from recess 48 and door 20 is free to swing open. Electronically actuatable door latches such as electronically actuatable door latch 26 are well known in the art and are configured to actuate (to move from an extended position to a retracted position) in response to electronic signals.

Controller 34 may be any type of computer, computer system, or microprocessor that is configured to perform algorithms, to execute software applications, to execute sub-routines and/or to be loaded with and to execute any other type of computer program. In some embodiments, a controller 34 may comprise only a single component. In other embodiments, controller 34 may comprise a plurality of components acting in concert. In some embodiments, controller 34 may be dedicated for use exclusively with embodiment 24 while in other embodiments, controller 34 may be shared with other systems on board vehicle 22.

In embodiment 24, controller 34 is operatively coupled with electronically actuatable door latch 26 via a wired connection. In other embodiments, such operative coupling could be accomplished wirelessly. Controller 34 is configured to receive inputs from multiple components onboard vehicle 22 and to actuate electronically actuatable door latch 26 or, in some circumstances, to refrain from actuating electronically actuatable door latch 26. For example, the door handle 50 and switch 32 are each communicatively coupled with controller 34. When a user 49 pulls on a door handle 50 from outside of vehicle 22 in an attempt to open door 20, door handle 50 sends a signal to controller 34 indicative of an attempt to open door 20. In response, controller 34 is configured to send a signal to electronically actuatable door latch 26 causing electronically actuatable door latch 26 to actuate. Similarly, when switch 32 is depressed, switch 32 transmits a signal to controller 34 indicative of an attempt to open door 20 from the inside of vehicle 22. In response, controller 34 is configured to send a signal to electronically actuatable door latch 26 causing it to actuate. In other embodiments, door handle 50 and/or switch 32 may be operatively coupled directly with electronically actuatable door latch 26 without the need for an intervening controller such as controller 34.

In some embodiments, controller 34 may be connected via a wire 52 to a speedometer, a position detection system, a tire sensor, an accelerometer, or any other device that is configured to detect when vehicle 22 is moving. Such system may be configured to transmit a signal to controller 34 via wire 52 indicative of vehicle 22 moving whenever vehicle 22 is in motion. In response to receiving such signal, controller 34 may be further configured to disregard any signals received from either switch 32 or from a door handle 50. In this manner, controller 34 may be configured to act as an interlock and to prevent door 20 from opening while vehicle 22 is in motion.

In the illustrated embodiment, actuating member 28 is connected to door 20 via hinge 36 and is substantially aligned with a longitudinal axis 54 of vehicle 22. Hinge 36 is configured to permit actuating member 28 to move in an outboard direction. Accordingly, when user 49 pushes on any part of actuating member 28, actuating member 28 will swing in an outboard direction. Movement of actuating member 28 in an outboard direction will cause actuating member 28 to engage switch 32. Such engagement will cause switch 32 to transmit the signal discussed above to controller 34, which, in turn, sends an actuating signal to electronically actuatable door latch 26.

Bracing member 30 is mounted to door 20 at a location proximate actuating member 28 and is substantially aligned with actuating member 28. Bracing member 30 provides a structure for a user 49 to grasp and to brace their hand against when pushing on actuating member 28. In this manner, user 49 may close their fist around bracing member 30 and, by twisting their fist around bracing member 30 towards actuating member 28, their closed fist will be compressed against actuating member 28. This compression will cause actuating member 28 to move in an outboard direction, closing switch 32, and thus causing controller 34 to actuate electronically actuatable door latch 26.

Spring 38 serves to bias actuating member 28 in an inboard direction. Thus, when user 49 is not pushing on actuating member 28, spring 38 pushes actuating member 28 inboard and out of engagement with switch 32. In other embodiments, any type of biasing member effective to bias actuating member 28 in an inboard direction may alternatively be used.

A cage engaging member 56 is positioned at an end of actuating member 28 and is configured to engage cage member 40. Cage member 40 is configured to confine inboard an outboard movement of actuating member 28 to within a predetermined range through engagement with cage engaging member 56.

Figure 2:
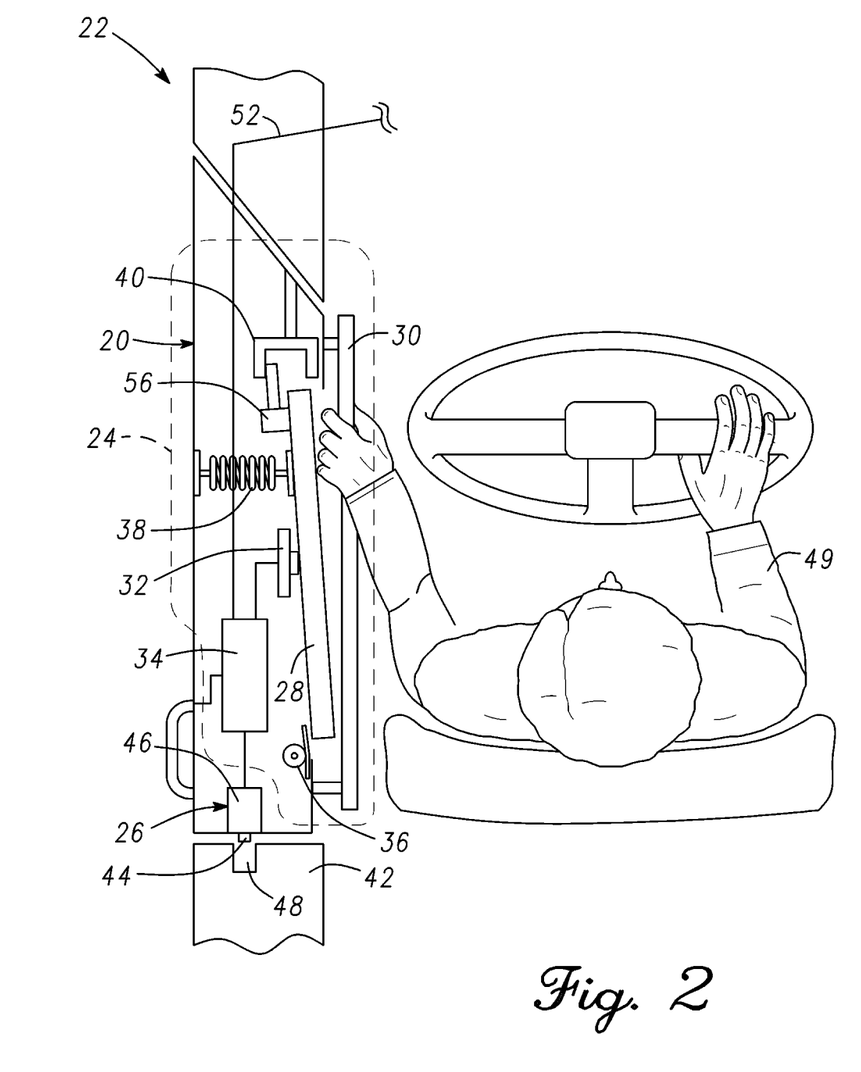
FIG. 2 is a schematic, overhead view illustrating the door of FIG. 1 during actuation of the door latch using the actuator arrangement.

FIG. 2 is a schematic, overhead view illustrating door 20 during actuation of electronically actuatable door latch 26 using embodiment 24 of the actuator arrangement. As illustrated, user 49 has grasped bracing member 30 with their hand and has twisted their hand around bracing member 30 causing their hand to compress against actuating member 28. Actuating member 28 has moved in an outboard direction, causing spring 38 to compress and causing switch 32 to close. This causes switch 32 to transmit a signal to controller 34 which, in turn, sends a signal to electronically actuatable door latch 26. In response to receiving the signal from controller 34, electronically actuatable door latch 26 actuates, causing latch portion 44 to retract within main body portion 46, thus disengaging latch portion 44 from recess 48. In the position illustrated in FIG. 2, door 20 may be pushed open.

As a result of user 49 pushing against bracing member 30 and causing actuating member 28 to move in an outboard direction, cage engaging member 56 engages with an outboard portion of cage member 40. This engagement inhibits any further movement of actuating member 28 in an outboard direction. Accordingly, if user 49 continues to push against actuating member 28, such force will be transmitted to door 20 and, in this manner, user 49 may open door 20 merely by continuing to push against actuating member 28.

Figure 3:
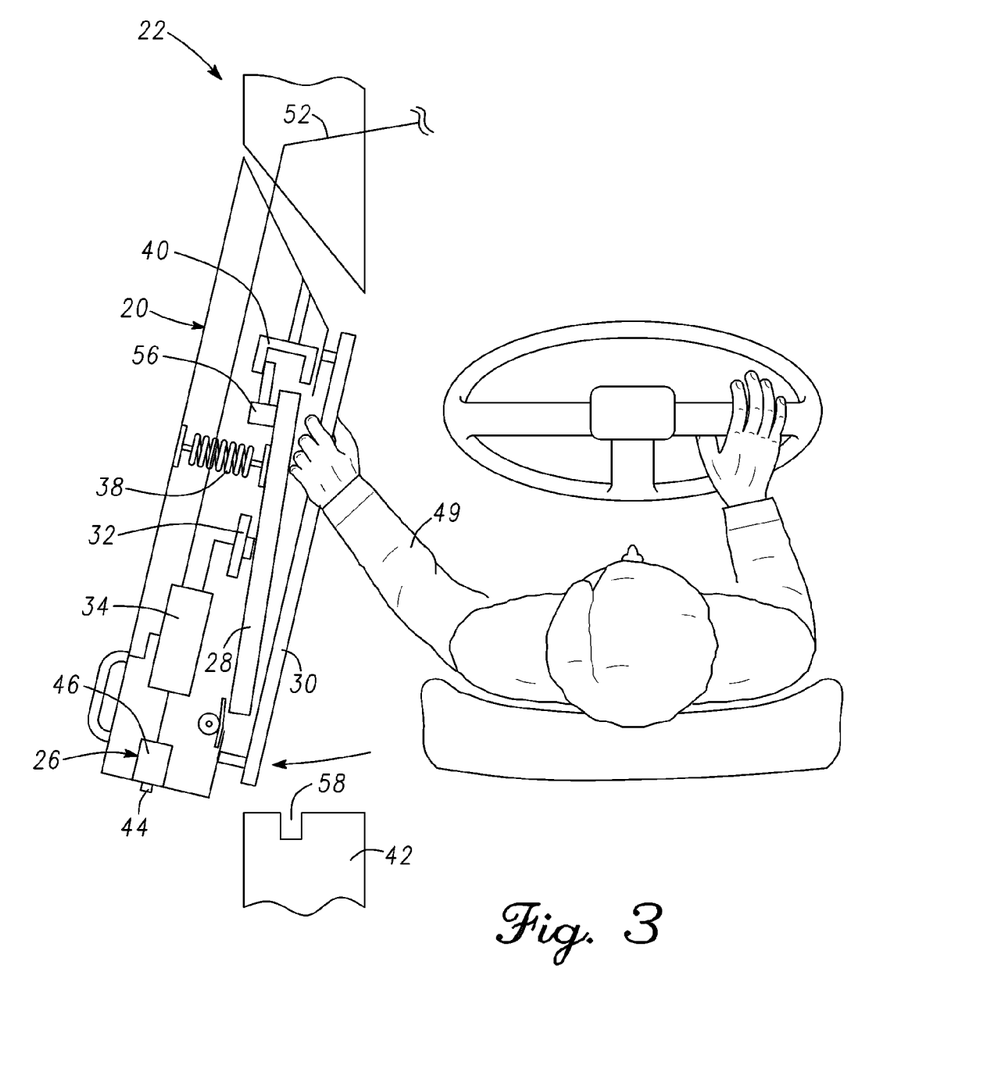
FIG. 3 is a schematic, overhead view illustrating the door of FIG. 2 as the door is pushed open after actuation of the door latch.

FIG. 3 is a schematic, overhead view illustrating door 20 as door 20 is pushed open subsequent to the actuation of electronically actuatable door latch 26. As illustrated, the hand of user 49 continues to push against actuating member 28 and thus door 20 has swung open. Additionally, because user 49 is continuing to push against actuating member 28, switch 32 remains depressed and latch portion 44 remains retracted within main body portion 46 of electronically actuatable door latch 26. In some embodiments, electronically actuatable door latch 26 will remain actuated for as long as switch 32 remains depressed while in other embodiments, electronically actuatable door latch 26 and/or controller 34 may be configured to return latch portion 44 to be extended position after the lapse of some predetermined period of time, regardless of the state of actuating member 28.

As illustrated in FIG. 3, bracing member 30 serves a second purpose. Not only does bracing member 30 facilitate the actuation of electronically actuatable door latch 26 by user 49, but bracing member 30 also allows user 49 to control the motion of door 20 as it swings in an outboard direction by serving as a grab handle for user 49 to grasp. In this manner, actuating member 28 and bracing member 30 cooperate to permit user 49 to simultaneously exert a pushing force and a pulling force on door 20 without having to move his/her hand between different locations as would be required when using a conventional door latch actuating mechanism.

Figure 4:
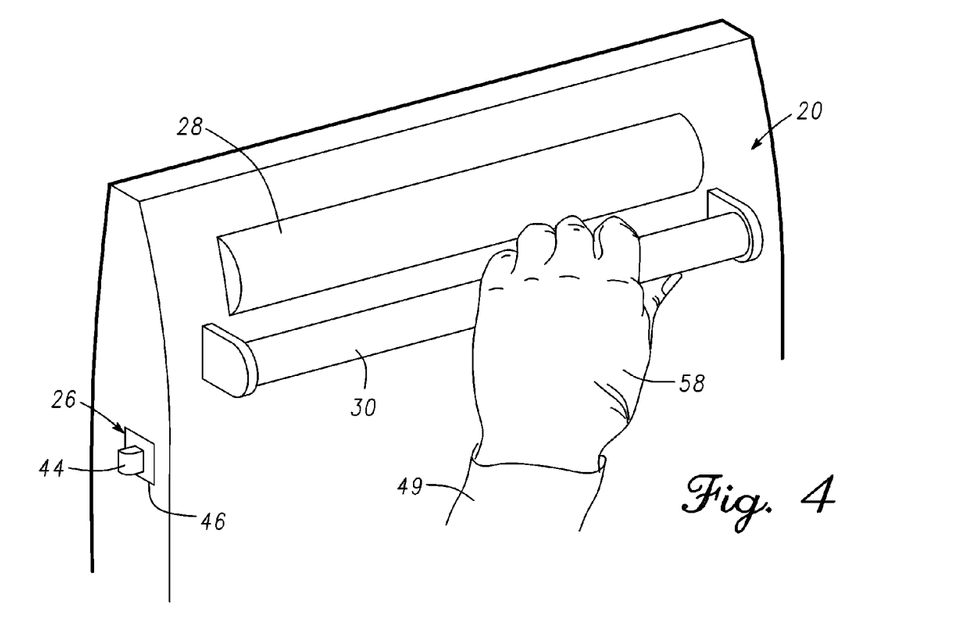
FIG. 4 is a perspective view illustrating the door of FIG. 1 prior to actuation of the door lock.

FIG. 4 is a perspective view illustrating door 20 prior to actuation of electronically actuatable door latch 26. User 49 places a hand 58 on bracing member 30. Bracing member 30 is mounted to door 20 in a position that is proximate to actuating member 28. The precise distance which bracing member 30 is positioned from actuating member 28 can vary from application to application and may be determined based on studies of variations in the size of the human hand. Once such information has been obtained, bracing member 30 may be spaced apart from actuating member 28 by a distance suitable to permit a desired portion of the population to actuate electronically actuatable door latch 26 in a manner described.

Figure 5:
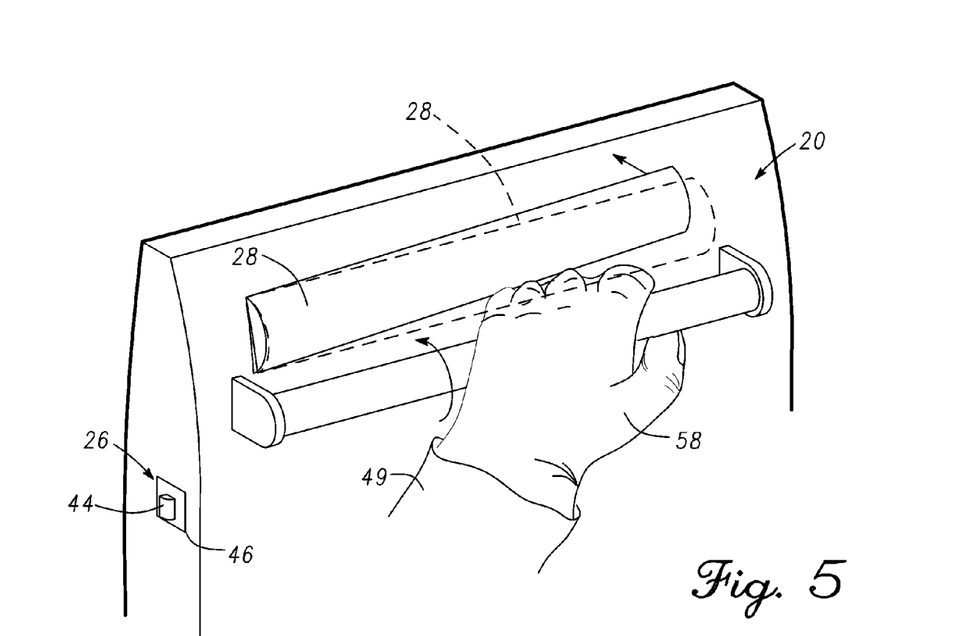
FIG. 5 is a perspective view illustrating actuation of the door lock using the actuator arrangement of FIG. 1.

FIG. 5 is a perspective view illustrating actuation of electronically actuatable door latch 26 through the use of bracing member 30 and actuating member 28. As illustrated, user 49 has twisted their hand 58 in the indicated direction. In FIG. 4, hand 58 was positioned such that only the fingers of hand 58 came between bracing member 30 and actuating member 28. In FIG. 5, with hand 58 having been twisted, now the knuckles and backside of hand 58 is positioned between bracing member 30 and actuating member 28. Because the knuckles and the backside of hand 58 are thicker than the fingers of hand 58, hand 58 compresses against actuating member 28. As a result of this compression, actuating member 28 moves in an outward direction from the position shown in solid lines to the position shown in phantom lines. As a result of such twisting movement of hand 58, latch portion 44 of electronically actuatable door latch 26 has refracted within main body portion 46.

Figure 6:
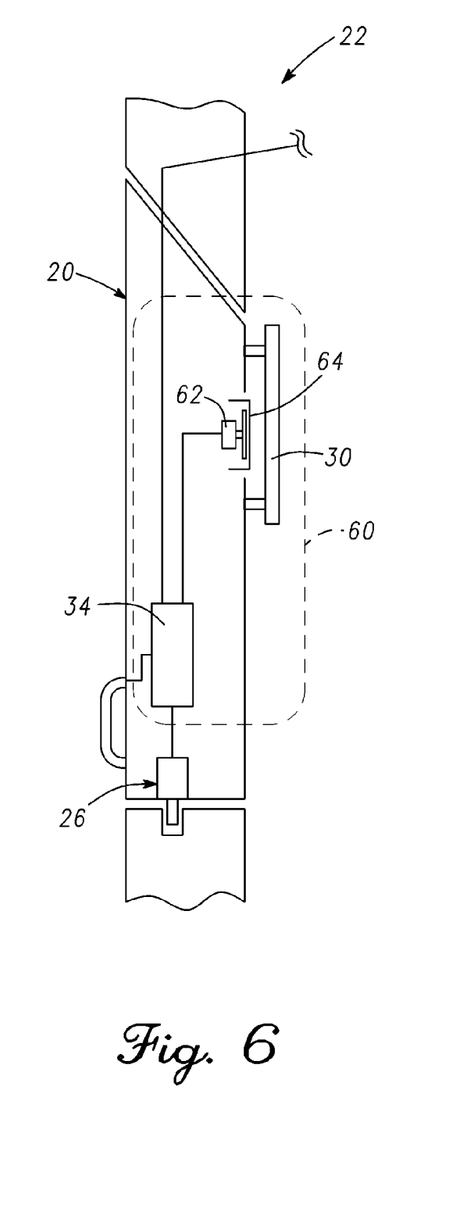
FIG. 6 is a schematic, overhead view illustrating a door equipped with an alternate embodiment of the actuator arrangement of the present disclosure prior to actuation of the door latch.

FIG. 6 is a schematic, overhead view illustrating door 20 equipped with an alternate embodiment 60 of the actuator arrangement of the present disclosure prior to actuation of electronically actuatable door latch 26. Alternate embodiment 60 includes a switch 62 which, when closed, will send a signal to controller 34 which, in turn, actuates electronically actuatable door latch 26. Switch 62 is positioned behind actuating member 64. Actuating member 64 is connected to door 20 and conceals switch 62 from view when within the interior of vehicle 22. Actuating member 64 is constructed of a deformable material (e.g., plastic) such that when a user presses against actuating member 64 in an outboard direction, actuating member 64 will deform in an outboard direction and will close switch 62. As with embodiments 24 of FIGS. 1-5, bracing member 30 is mounted to door 20 at a positioned proximate actuating member 64 and is configured to permit a user to brace against bracing member 30 when pressing against actuating member 64.

Figure 7:
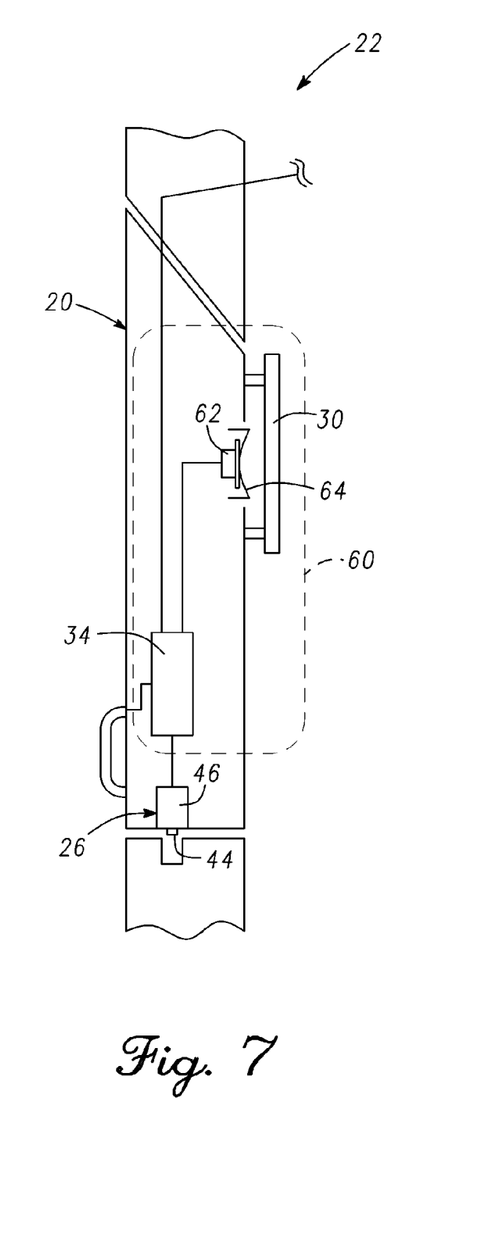
FIG. 7 is a schematic, overhead view illustrating the alternate embodiment of FIG. 6 during actuation of the door latch using the alternate embodiment of the actuator arrangement of FIG. 6.

FIG. 7 is a schematic, overhead view illustrating alternate embodiment 60 during actuation of electronically actuatable door latch 26. As illustrated, a force has been applied in an outboard direction to actuating member 64 causing it to deform and to press against the switch 62, closing it. In response, switch 62 sends a signal to controller 34 which, in turn, actuates electronically actuatable door latch 26, causing latch portion 44 to retract within main body portion 46. If a user were to continue pressing against actuating member 64, door 20 would swing open.

Figure 8:
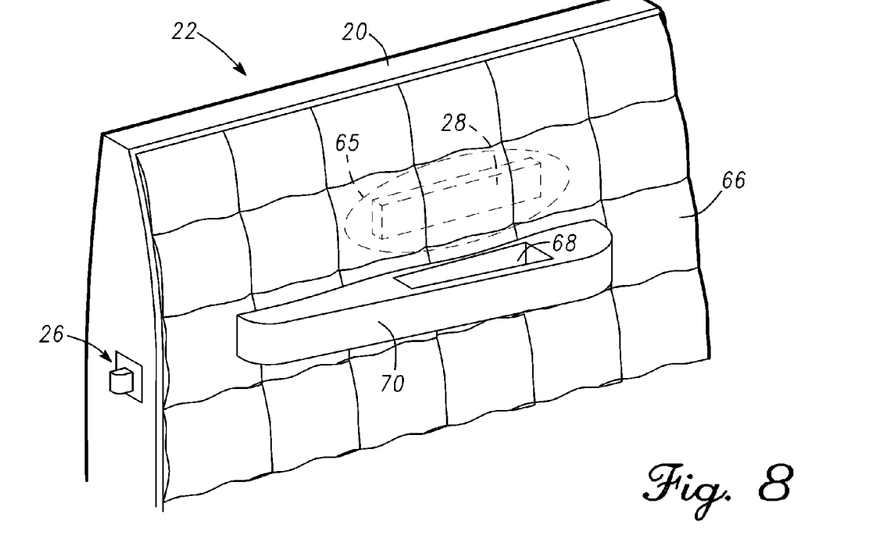
FIG. 8 is a perspective view illustrating a door of a vehicle equipped with another alternate embodiment of an actuator arrangement of the present disclosure.

FIG. 8 is a perspective view illustrating door 20 of vehicle 22 equipped with another alternate embodiment 65 of an actuator arrangement of the present disclosure. In alternate embodiment 65, actuating member 28 is concealed behind interior trim 66 which covers an interior portion of door 20. Interior trim may comprise leather, suede, vinyl, or any other suitable material effective to serve the purpose of rendering the interior portion of door 20 aesthetically pleasing. Actuating member 28 is concealed behind interior trim 66 but is nevertheless actuatable by pressing against a portion of interior trim 66 disposed over actuating member 28.

A bracing member 68 is disposed proximate actuating member 28. As illustrated in FIG. 8, bracing member 68 comprises a recess defined in an armrest 70. A user seeking to actuate electronically actuatable door latch 26 need only position their hand on armrest 70 with a portion of their hand resting in the recess of bracing member 68. Then, by bracing one or more fingers against an inboard wall of the recess, the user can push the back of their hand against actuating member 28 through interior trim 66. This will, in turn, actuate electronically actuatable door latch 26.

Figure 9:
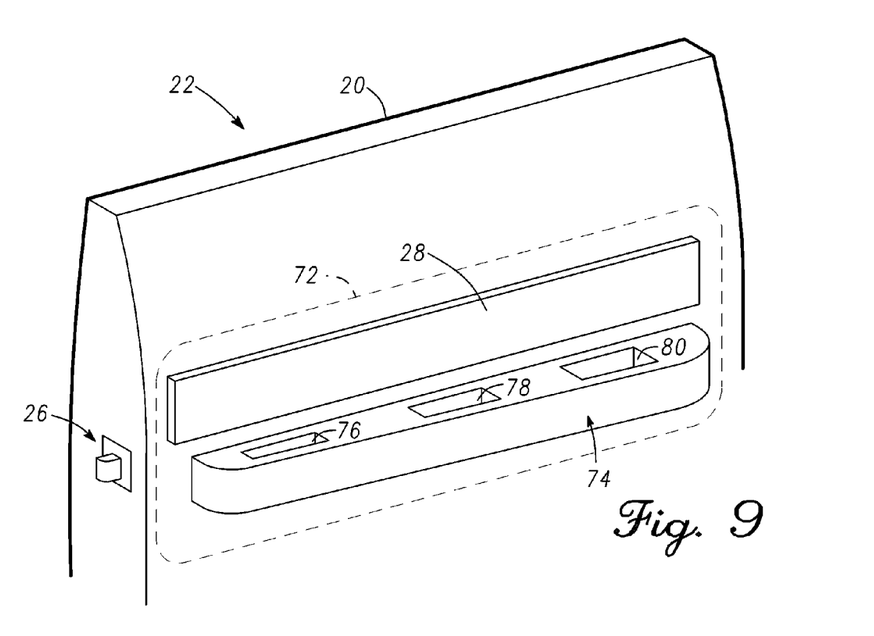
FIG. 9 is a perspective view illustrating a door of the vehicle equipped with another alternate embodiment of an actuator arrangement of the present disclosure.

FIG. 9 is a perspective view illustrating door 20 of vehicle 22 equipped with another alternate embodiment 72 of the actuator arrangement of the present disclosure. As illustrated, actuating member 28 extends substantially the entire length of door 20. An armrest 74 includes three bracing members, a bracing member 76, a bracing member 78, and a bracing member 80 aligned in the longitudinal direction of vehicle 22 and positioned to permit a user to engage actuating member 28 at any convenient location along a longitudinal length of actuating member 28. Although armrest 74 depicts three bracing members, it should be understood that a greater or lesser number of bracing members may be incorporated into armrest 74 without departing from the teachings of the present disclosure.

Figure 10:
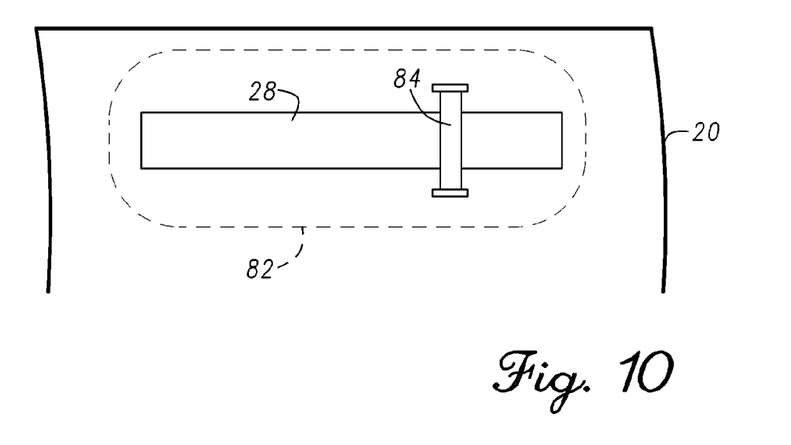
FIG. 10 is a schematic view illustrating a door of the vehicle equipped with another alternate embodiment of an actuator arrangement of the present disclosure.

FIG. 10 is a schematic view illustrating door 20 equipped with another alternate embodiment 82 of an actuator arrangement of the present disclosure. Alternate embodiment 82 includes actuating member 28 and a bracing member 84. With continuing reference to FIGS. 1-5 and 10, alternate embodiment 82 differs from embodiment 24 in that bracing member 84 is oriented in the direction that is transverse to actuating member 28. In the illustrated embodiment, bracing member 84 is configured and positioned to bridge over a generally central portion of actuating member 28. In other embodiments, bracing member 84 may be positioned at any other suitable location. In still other embodiments, bracing member 84 may be configured to move with respect to door 20 in the direction of the longitudinal axis of the vehicle to permit a user to position bracing member 84 at any desired location with respect to actuating member 28.

Figure 11:
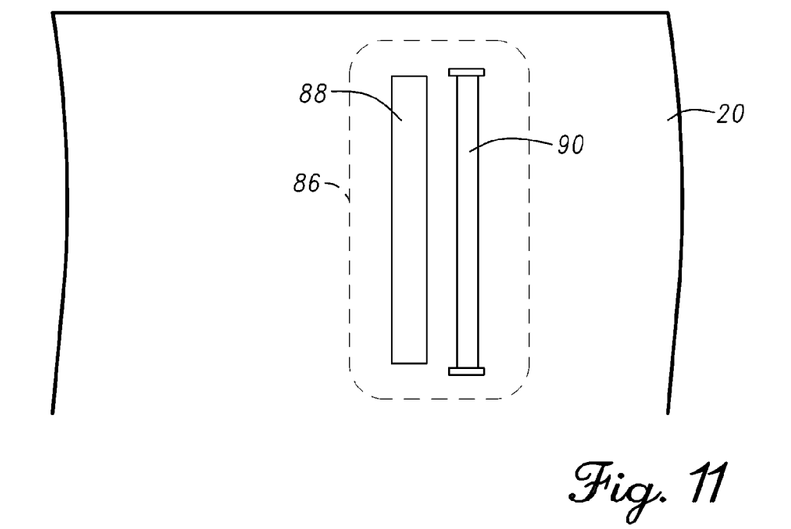
FIG. 11 is a schematic view illustrating a door of the vehicle equipped with another alternate embodiment of an actuator arrangement of the present disclosure.

FIG. 11 is a schematic view illustrating door 20 equipped with another alternate embodiment 86 of an actuator arrangement of the present disclosure. In alternate embodiment 86, an actuating member 88 and a bracing member 90 are each oriented in the direction substantially transverse to a longitudinal axis of the vehicle. Although actuating member 88 and bracing member 90 are each illustrated as being substantially upright, it should be understood that actuating member 88 and bracing member 90 may each be oriented at any desired angle without departing from the teachings of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. An actuator arrangement for an electronically actuatable door latch that controls a door of a vehicle, the actuator arrangement comprising:
   the door;
   the electronically actuatable door latch mounted to the door;
   an actuating member configured for direct engagement with a hand of a user, the actuating member mounted directly on the door and disposed within a passenger compartment of the vehicle and operatively coupled to the electronically actuatable door latch, the actuating member configured to actuate the electronically actuatable door latch when the actuating member is pushed in an outboard direction; and
   a bracing member mounted to the door proximate the actuating member at a position inboard of the actuating member, such that the bracing member remains stationary with respect to the door and permits a user to brace against the bracing member when pushing the actuating member in the outboard direction,
   wherein the actuating member and the bracing member are configured to be mounted to a portion of the door facing an interior of the vehicle, and
   wherein the bracing member and the actuating member are arranged on the door in a manner that permits contemporaneous direct engagement by the hand of the user when the user actuates the electronically actuatable door latch.

2. The actuator arrangement of claim 1, wherein the actuating member comprises a first elongate body having a first length, and wherein the actuating member extends along a length of the door in a first direction generally aligned with a longitudinal axis of the vehicle.

3. The actuator arrangement of claim 2, wherein the actuating member extends along substantially an entire length of the door.

4. The actuator arrangement of claim 2, wherein the bracing member comprises a second elongate body having a second length, wherein the bracing member extends along the length of the door in a second direction generally aligned with the actuating member, and wherein the first length and the second length are substantially equal.

5. The actuator arrangement of claim 2, wherein the bracing member is substantially transverse to the actuating member.

6. The actuator arrangement of claim 5, wherein the bracing member forms a bridge extending over the actuating member.

7. The actuator arrangement of claim 1, wherein the actuating member comprises a first elongate body having a first length, and wherein the actuating member extends along a length of the door in a third direction generally transverse to a longitudinal axis of the vehicle.

8. The actuator arrangement of claim 7, wherein the bracing member comprises a second elongate body having a second length, wherein the bracing member extends along the length of the door in a fourth direction generally aligned with the actuating member, and wherein the first length and the second length are substantially equal.

9. The actuator arrangement of claim 1, further comprising a plurality of the bracing members.

10. The actuator arrangement of claim 1, further comprising a hinge connecting the actuating member to the door.

11. The actuator arrangement of claim 10, further comprising a biasing member connected to the actuating member, the biasing member biasing the actuating member in an inboard direction.

12. The actuator arrangement of claim 11, further comprising a cage member configured to at least partially envelop at least a portion of the actuating member and to limit inboard movement of the actuating member.

13. The actuator arrangement of claim 1, wherein the actuating member comprises a deformable body, wherein the actuating member is configured to deform when pushed, and wherein deformation of the actuating member actuates the electronically actuatable door latch.

14. The actuator arrangement of claim 1, further comprising a door trim member disposed over of the actuating member and substantially concealing the actuating member.

15. The actuator arrangement of claim 1, wherein the bracing member comprises a recess in an armrest.

16. The actuator arrangement of claim 1, wherein the bracing member is positioned not greater than a predetermined distance from the actuating member.

17. The actuator arrangement of claim 16, wherein the predetermined distance corresponds with a size of a human hand.

18. An actuator arrangement for an electronically actuatable door latch that controls a door of a vehicle, the actuator arrangement comprising:
the door;
an actuating member configured for direct engagement with a hand of a user, the actuating member mounted directly on the door and disposed within a passenger compartment of the vehicle such that the engagement member is directly accessible to the user when the user is seated within the passenger compartment and the actuating member configured to move in an outboard direction relative to the door;
a switch positioned to engage the actuating member when the actuating member moves in the outboard direction, the switch operatively coupled to the electronically actuatable door latch and configured to actuate the electronically actuatable door latch when the actuating member moves in the outboard direction; and
a bracing member mounted to the door proximate the actuating member at a position inboard of the actuating member, such that the bracing member remains stationary with respect to the door and permits a user to brace against the bracing member when pushing the actuating member in the outboard direction,
wherein the actuating member and the bracing member are spaced apart from one another, and
wherein the bracing member and the actuating member are arranged on the door in a manner that permits contemporaneous direct engagement by the hand of the user when the user actuates the electronically actuatable door latch.

19. An actuator arrangement for an electronically actuatable door latch that controls a door of a vehicle, the actuator arrangement comprising:
the door;
an actuating member configured for direct engagement with a hand of a user, the actuating member mounted directly on the door and disposed within a passenger compartment of the vehicle such that the engagement surface is directly accessible to the user when the user is seated within the passenger compartment and the actuating member configured to move in an outboard direction relative to the door;
a switch positioned to engage the actuating member when the actuating member moves in the outboard direction and configured to transmit an actuation signal when the actuating member engages the switch;
a controller communicatively coupled with the switch and operatively coupled with the electronically actuatable door latch, the controller configured to actuate the electronically actuatable door latch when the controller receives the actuation signal from the switch; and
a bracing member mounted to the door proximate the actuating member at a position inboard of the actuating member, such that the bracing member remains stationary with respect to the door and permits a user to brace against the bracing member when pushing the actuating member in the outboard direction,
wherein the actuating member and the bracing member are spaced apart from one another, and
wherein the bracing member and the actuating member are arranged on the door in a manner that permits contemporaneous direct engagement by the hand of the user when the user actuates the electronically actuatable door latch.

20. The actuator arrangement of claim 19, wherein the controller is further configured to refrain from actuating the electronically actuatable door latch when the vehicle is moving.

* * * * *